US012743205B2

(12) United States Patent
Dutu et al.

(10) Patent No.: US 12,743,205 B2
(45) Date of Patent: Sep. 22, 2026

(54) ATOMIC EXECUTION OF PROCESSING-IN-MEMORY OPERATIONS

(71) Applicant: Advanced Micro Devices, Inc., Santa Clara, CA (US)

(72) Inventors: Alexandru Dutu, Kirkland, WA (US); Sooraj Puthoor, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/211,544

(22) Filed: Jun. 19, 2023

(65) Prior Publication Data

US 2024/0419330 A1 Dec. 19, 2024

(51) Int. Cl.
*G06F 3/06* (2006.01)
*G06F 15/78* (2006.01)

(52) U.S. Cl.
CPC ............ *G06F 3/061* (2013.01); *G06F 3/0659* (2013.01); *G06F 3/0685* (2013.01); *G06F 15/7821* (2013.01)

(58) Field of Classification Search
CPC ............................ G06F 11/1435; G06F 12/06
See application file for complete search history.

(56) References Cited

U.S. PATENT DOCUMENTS 6,734,862 B1 5/2004 Chapple et al.
11,086,815 B1 8/2021 Santan et al.
11,429,315 B1 8/2022 Pream et al.
11,934,827 B2 3/2024 Puthoor et al.
12,041,179 B2 * 7/2024 Shaw .................... H04L 9/0897
12,461,684 B2 11/2025 Dutu et al.
2012/0020371 A1 1/2012 Nemawarkar et al.
2013/0318280 A1 11/2013 Dalal et al.
2016/0026571 A1 * 1/2016 Fukuyama ............ G06F 12/084 711/125
2016/0276002 A1 * 9/2016 Lee ......................... G06F 12/06
2017/0060588 A1 3/2017 Choi
2019/0041952 A1 2/2019 Alameldeen et al.
2020/0389402 A1 12/2020 Goyal
2022/0011939 A1 * 1/2022 Singh ................. G06F 11/0772

(Continued)

OTHER PUBLICATIONS

U.S. Appl. No. 17/135,209 , "Non-Final Office Action", U.S. Appl. No. 17/135,209, Jul. 7, 2023, 34 pages.

(Continued)

*Primary Examiner* — Getente A Yimer
(74) *Attorney, Agent, or Firm* — FIG. 1 Patents

(57) ABSTRACT

Scheduling processing-in-memory transactions in systems with multiple memory controllers is described. In accordance with the described techniques, an addressing system segments operations of a transaction into multiple microtransactions, where each microtransaction includes a subset of the transaction operations that are scheduled by a corresponding one of the multiple memory controllers. Each transaction, and its associated microtransactions, is assigned a transaction identifier based on a current counter value maintained at the multiple memory controllers, and the multiple memory controllers schedule execution of microtransactions based on associated transaction identifiers to ensure atomic execution of operations for a transaction without interruption by operations of a different transaction.

20 Claims, 5 Drawing Sheets

(56) References Cited

U.S. PATENT DOCUMENTS

| | | | | |
|---|---|---|---|---|
| 2022/0114270 | A1 | 4/2022 | Wang et al. | |
| 2022/0206869 | A1 | 6/2022 | Ramachandran et al. | |
| 2022/0342551 | A1 * | 10/2022 | Bora | G06F 11/1435 |
| 2023/0099163 | A1 * | 3/2023 | Chu | G06F 15/7821<br>712/34 |
| 2023/0418474 | A1 | 12/2023 | Kim et al. | |
| 2024/0211256 | A1 | 6/2024 | Puthoor et al. | |
| 2024/0220160 | A1 | 7/2024 | Dutu et al. | |

OTHER PUBLICATIONS

Aguilera, Paula , et al., "Fine-Grained Task Migration for Graph Algorithms Using Processing in Memory", 2016 IEEE International Parallel and Distributed Processing Symposium Workshops (IPDPSW) [retrieved Aug. 10, 2023]. Retrieved from the Internet <https://doi.org/10.1109/IPDPSW.2016.205>, May 2016, 10 pages.

Chu, Michael , et al., "High-level Programming Model Abstractions for Processing in Memory", [retrieved Oct. 16, 2022]. Retrieved from the Internet <https://www.cs.utah.edu/wondp/wondp-pim-hlm-final.pdf>., 2013, 4 Pages.

Draper, Jeff , et al., "The Architecture of the DIVA Processing-In-Memory Chip", ICS '02: Proceedings of the 16th international conference on Supercomputing [retrieved Aug. 10, 2023]. Retrieved from the Internet <https://doi.org/10.1145/514191.514197>, Jun. 2002, 12 pages.

Dutu, Alexandru , et al., "US Application as Filed", U.S. Appl. No. 18/148,000, filed Dec. 29, 2022, 50 pages.

Lockerman, Elliot , et al., "Livia: Data-Centric Computing Throughout the Memory Hierarchy", Proceedings of the Twenty-Fifth International Conference on Architectural Support for Programming Languages and Operating Systems [retrieved Oct. 16, 2022]. Retrieved from the Internet <https://people.csail.mit.edu/sanchez/papers/2020.livia.asplos.pdf>., Mar. 13, 2020, 17 Pages.

Pattnaik, Ashutosh , et al., "Scheduling techniques for GPU architectures with processing-in-memory capabilities", PACT '16: Proceedings of the 2016 International Conference on Parallel Architectures and Compilation [retrieved Oct. 16, 2022]. Retrieved from the Internet <https://research.ece.cmu.edu/safari/pubs/scheduling-for-GPU-processing-in-memory_pact16.pdf>., Sep. 11, 2016, 14 Pages.

Zois, Vasileios , et al., "Massively Parallel Skyline Computation for Processing-In-Memory Architectures", PACT 18: Proceedings of the 27th International Conference on Parallel Architectures and Compilation Techniques [retrieved Aug. 10, 2023]. Retrieved from the Internet <https://doi.org/10.1145/3243176.3243187>, Nov. 1, 2018, 12 pages.

"Final Office Action", U.S. Appl. No. 18/148,000, Dec. 12, 2024, 12 pages.

"Non-Final Office Action", U.S. Appl. No. 18/148,000, Mar. 4, 2025, 11 pages.

U.S. Appl. No. 17/135,209, "Final Office Action", U.S. Appl. No. 17/135,209, Feb. 1, 2024, 44 pages.

U.S. Appl. No. 17/135,209, "Non-Final Office Action", U.S. Appl. No. 17/135,209, Sep. 10, 2024, 35 pages.

U.S. Appl. No. 18/148,000, "Non-Final Office Action", U.S. Appl. No. 18/148,000, Jul. 18, 2024, 9 pages.

Hall, Mary W, et al., "Memory Management in a PIM-Based Architecture", IMS '00: Revised Papers from the Second International Workshop on Intelligent Memory Systems, Nov. 2000, 18 pages.

Puthoor, Sooraj , et al., "US Application as Filed", U.S. Appl. No. 18/601,006, filed Mar. 11, 2024, 30 pages.

"Final Office Action", U.S. Appl. No. 17/135,209, Apr. 24, 2025, 40 pages.

"Corrected Notice of Allowability", U.S. Appl. No. 18/148,000, Oct. 16, 2025, 2 pages.

"Notice of Allowance", U.S. Appl. No. 18/148,000, Jul. 31, 2025, 7 pages.

* cited by examiner

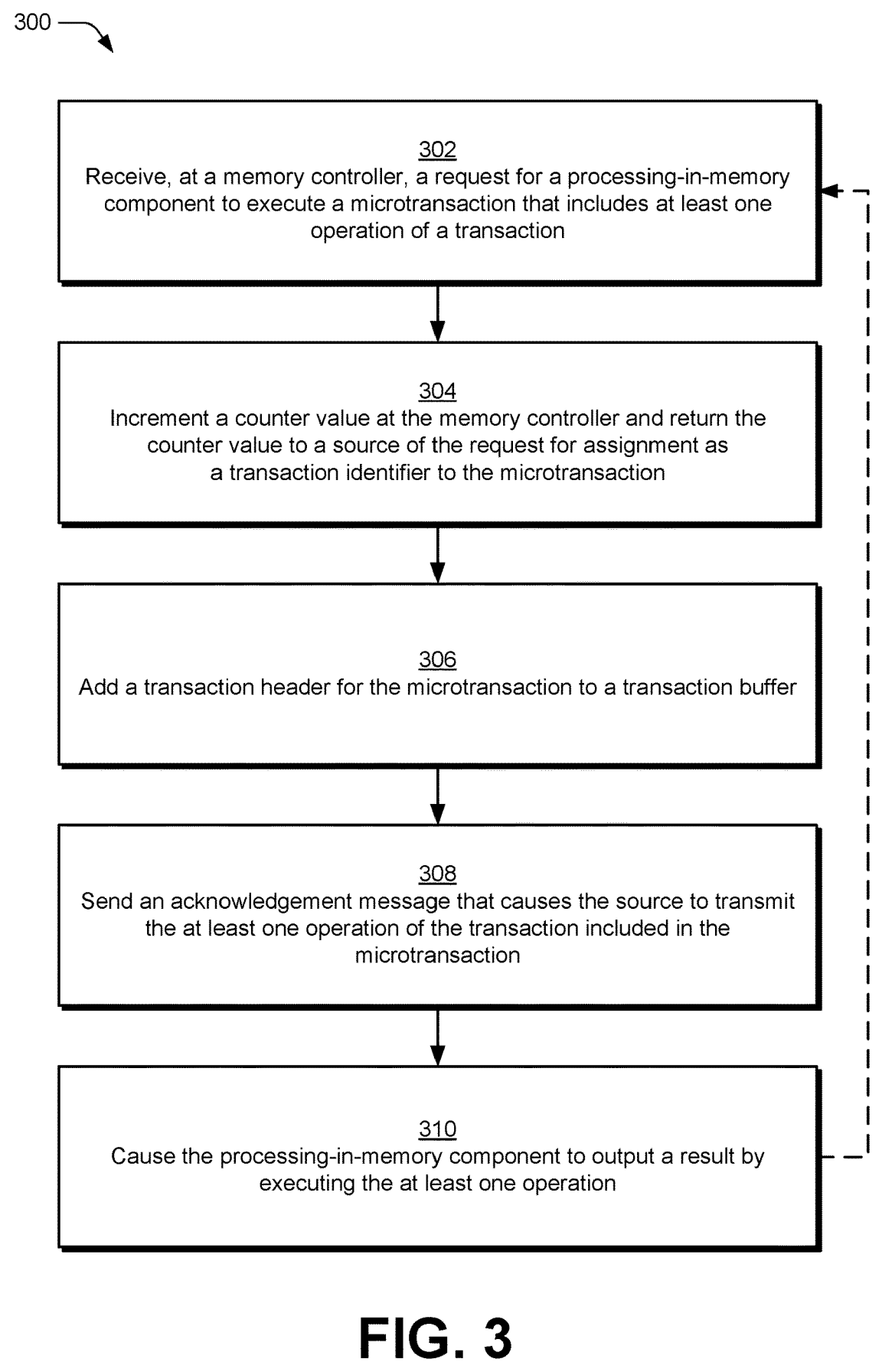

300

302
Receive, at a memory controller, a request for a processing-in-memory component to execute a microtransaction that includes at least one operation of a transaction 304
Increment a counter value at the memory controller and return the counter value to a source of the request for assignment as a transaction identifier to the microtransaction 306
Add a transaction header for the microtransaction to a transaction buffer 308
Send an acknowledgement message that causes the source to transmit the at least one operation of the transaction included in the microtransaction 310
Cause the processing-in-memory component to output a result by executing the at least one operation

FIG. 3

ATOMIC EXECUTION OF PROCESSING-IN-MEMORY OPERATIONS

BACKGROUND

Processing-in-memory (PIM) architectures move processing of memory-intensive computations to memory. This contrasts with standard computer architectures which communicate data back and forth between a memory and a processing unit. In terms of data communication pathways, processing units of conventional computer architectures are further away from memory than processing-in-memory components. As a result, these conventional computer architectures suffer from increased data transfer latency, which can decrease overall computer performance. Further, due to the proximity to memory, PIM architectures can also provision higher memory bandwidth and reduced memory access energy relative to conventional computer architectures particularly when the volume of data transferred between the memory and the processing unit is large. Thus, processing-in-memory architectures enable increased computer performance while reducing data transfer latency as compared to conventional computer architectures that implement processing hardware outside of, or far from, memory.

BRIEF DESCRIPTION OF THE DRAWINGS

FIG. 3 depicts a procedure in an example implementation of scheduling processing-in-memory transactions with different memory controllers.

DETAILED DESCRIPTION

Overview

Figure 1:
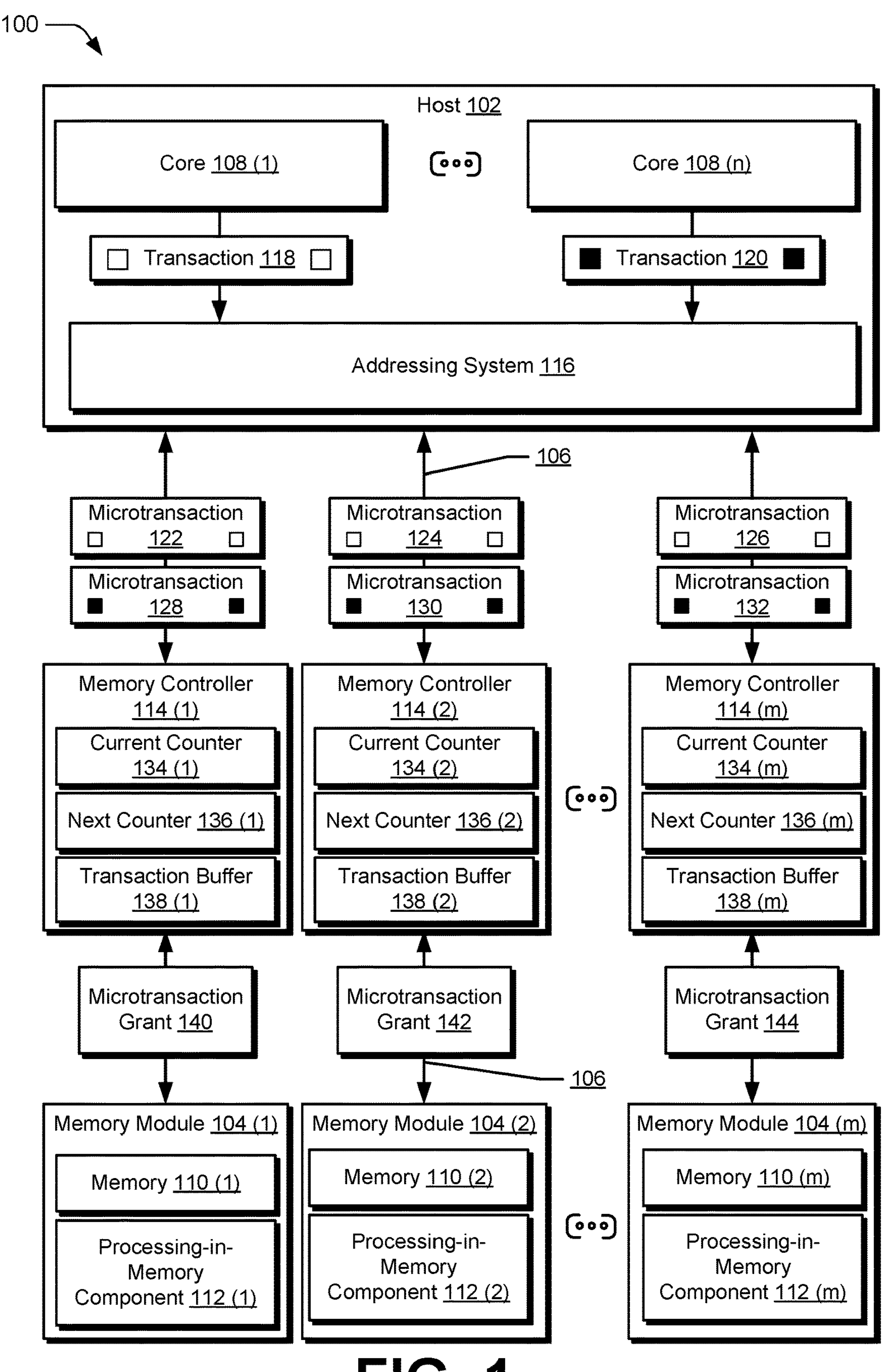
FIG. 1 is a block diagram of an example system having a host with at least one core and multiple memory segments, where each of the multiple memory segments include memory and are associated with a processing-in-memory component and a memory controller.

Computer architectures with PIM components implement processing devices embedded in memory hardware (e.g., memory chips). By implementing PIM components in memory hardware, PIM architectures are configured to provide memory-level processing capabilities to a variety of applications, such as applications executing on a host processing device that is communicatively coupled to the memory hardware. In such implementations where the PIM component provides memory-level processing for an application executed by the host processing device, the host processing device controls the PIM component by dispatching one or more application operations for performance by the PIM component. In some implementations, the host processing device tasks the PIM component with executing a transaction, which includes multiple operations that must be performed sequentially and without interruption by the PIM component. In conventional computer architectures that do not implement PIM components, a host processing device executing operations that would otherwise be offloaded to a PIM component places a lock on data stored in memory that is processed as part of executing the operations.

In scenarios where the locked memory is shared by one or more different processing devices, other requests to access data stored at locked memory addresses are denied, which causes a requesting host to abort and restart a denied request. Conventional architectures thus force host processing devices to repeatedly request access to locked memory addresses until a lock is removed and access is granted. In high contention scenarios where numerous host processing devices request access to a common memory address, traffic on communication interfaces that connect the hosts to memory increases, unduly increasing memory bus traffic and often creating a bottleneck that results in computing system inefficiencies. Further, repeatedly transmitting aborted requests unnecessarily consumes processing resources and associated power.

These problems are further compounded when scheduling PIM transactions using system architectures with multiple memory controllers. In system architectures with multiple memory controllers, each memory controller is assigned to manage a designated segment of the system's memory. By associating different memory controllers with different memory segments, such system architectures improve memory access performance, increase parallelism, and enable workload distribution among different memory controllers.

Some example system architectures that implement multiple different memory controllers include memory interleaving architectures, memory channel segmentation architectures, memory module segmentation architectures, memory region segmentation architectures, and so forth. For instance, memory interleaving architectures divide memory address space into interleaved segments, and each memory controller manages a separate segment. For example, if there are two memory controllers (e.g., Controller A and Controller B), Controller A manages even memory addresses, while Controller B manages odd memory addresses. This memory interleaving architecture enables simultaneous access to separate memory locations by the two memory controllers, improving memory bandwidth and overall system performance.

In memory channel segmentation architectures (e.g., multi-channel memory systems), each memory channel is associated with a separate memory controller. Memory channels thus represent independent pathways between the memory modules and the memory controllers. Each memory controller manages a specific channel and the memory modules connected to that channel. This approach increases parallelism and memory bandwidth by allowing multiple memory controllers to access different memory modules simultaneously.

In memory module segmentation architectures, memory controllers are directly associated with specific memory modules or memory banks within those memory modules. Each memory controller manages the data access and operations related to its assigned memory module(s). This memory module segmentation approach can be useful in systems with non-uniform memory architectures (NUMA) where memory access latency and bandwidth differ between memory modules.

In memory region segmentation architectures, such as systems with heterogeneous memory architectures (e.g., systems combining high-performance DRAM and high-capacity non-volatile memory), each memory controller is assigned to manage a specific type or region of memory. For example, one controller could manage the high-performance DRAM, while another controller manages the high-capacity non-volatile memory.

Thus, various system architectures leverage multiple different memory controllers, which are individually associated with different segments of memory addresses, to distribute computational workloads, increase parallelism, and improve overall system performance. In the context of the following description, reference is made to individual memory controllers being associated with individual memory modules for purposes of simplicity. However, the techniques described herein are extendable to any suitable type of multiple memory controller system architecture where each memory controller is responsible for scheduling execution of operations involving data stored in one or more memory addresses assigned to the memory controller.

In systems with multiple memory controllers, problems arise when dealing with a string of PIM operations, which need to be executed atomically, that involves processing data stored in memory locations that are handled by different memory controllers. In computing terms, a sequence of "atomic" operations refers to a series of indivisible tasks that are executed sequentially (e.g., one after another) without being interrupted. Atomic operations are often crucial for maintaining consistency, synchronization, and data integrity in concurrent or parallel programming environments. Such operations are referred to as "atomic" because the operations cannot be broken down into smaller steps, and they appear to be instantaneous from the perspective of other processes or threads. As a result, atomic operation sequences ensure that the system remains in a consistent state, even when multiple threads or processes are competing for access to shared resources.

Given such constraints of executing an atomic sequence of operations included in a transaction, it remains a challenge to schedule operations of PIM transactions that involve data stored in locations handled by different memory controllers while ensuring that the PIM operations are executed atomically across the different memory controllers.

To address these conventional problems, scheduling processing-in-memory transactions for systems that include multiple memory controllers is described. In implementations, a system includes multiple memory segments (e.g., multiple memory modules) that each include a defined range of memory addresses and are associated with a PIM component that is configured to execute PIM operations using data stored in the defined range of memory addresses of the memory with which the PIM component is associated. Each memory segment is communicatively coupled to at least one core of at least one host, such as a core of a host processor. The system further includes multiple memory controllers, where each of the multiple memory controllers is associated with one of the multiple memory segments (e.g., each memory controller is responsible for scheduling operations executed by the PIM component associated with the corresponding memory segment). In implementations, one or more of the memory controllers are implemented locally at a host processor, implemented at the memory segment with which the memory controller is associated, or is implemented separate from a host processor and an associated memory segment.

To efficiently schedule PIM transactions that involve executing operations using data stored in two or more of the memory segments, the system further includes an addressing system. The addressing system is configured to direct requests made by one or more host cores for PIM components to execute operations of a transaction on behalf of the host cores, using data stored in various segments of the memory. To do so, the addressing system receives a transaction header for each PIM transaction request. Each transaction header includes information that describes a task identifier for the transaction, a source identifier associated with a source (e.g., a host core) that requested the transaction), and at least on virtual address for data stored in various memory segments that include data to be processed as part of performing the transaction.

Each transaction header includes information describing a number of operations that are to be executed by different PIM components as part of performing the transaction, along with transaction start and transaction end instructions that are issued by the requesting host. Each transaction header further includes information describing a number of operations that are to be executed by the PIM component as part of performing the transaction. In implementations, a transaction including multiple operations requires that the multiple operations be performed atomically (i.e., performed sequentially and without interruption by a PIM component performing an operation not involved in the transaction).

The addressing system is configured to translate, for each operation of a requested transaction, a virtual address for the operation to a physical address for the system, where the physical address represents an actual address in memory at which data processed during execution of the operation is stored. Using the physical address information for each transaction operation, the addressing system generates a plurality of microtransactions for the requested transaction, where each microtransaction includes one or more operations of the transaction that involve processing of data stored in memory managed by a respective one of the multiple memory controllers. In this manner, each microtransaction includes operations of a requested transaction that involve processing data stored in physical memory addresses managed by one of the system's multiple memory controllers.

To ensure that atomicity of a transaction is maintained, the addressing system assigns a transaction identifier for a requested transaction to each microtransaction generated for the requested transaction. The transaction identifier includes information specifying an order in which operations of a microtransaction are to be executed relative to operations of other microtransactions, independent of (e.g., without respect to) an order in which a memory controller receives different microtransactions from a requesting source. To do so, each memory controller of the system is configured as including two counters, where one counter indicates a value representing a current transaction identifier being executed by the memory controller and another counter indicates a value representing a next transaction identifier that should be assigned to a newly requested transaction.

The addressing system is configured to generate microtransactions for a PIM transaction using packets that atomically increment the next counter at a receiving memory controller and return the next counter value to the addressing system. The returned value is used as the transaction identifier for the transaction and each of its microtransactions as generated by the addressing system. In implementations, incrementing the next counter at a receiving memory controller is performed based on a thread identifier of a thread that initiated the transaction request. In some implementations, the thread identifier is representative of a stream identifier and a requestor identifier for a source that initiated the PIM transaction request. Alternatively or additionally, the thread identifier is computed based on a number of threads that have previously requested performance of a PIM transaction, a number that indicates a number of past PIM transactions that have been completed, combinations thereof, and so forth.

In this manner, the addressing system ensures that all operations of a PIM transaction from one thread are executed atomically and not interrupted by execution of operations of another transaction from a different thread. Advantageously, the addressing system thus ensures atomic execution of a transaction that involves scheduling PIM operations by different memory controllers even in an event of oversubscription where more threads are attempting to execute transactions than a number of a hardware threads that can run concurrently for a given system architecture.

In some implementations, each memory controller includes a transaction buffer, which is configured to maintain a list of transaction identifiers representing different microtransaction request received at the memory controller. The memory controller increments its current counter upon completion of a given microtransaction by the PIM component associated with the microcontroller and schedules execution of another microtransaction having a buffered transaction identifier that equals the incremented value of the current counter.

When granting a microtransaction request, the memory controller sends an acknowledgement message to a host associated with a source identifier described in a transaction header for the microtransaction request being granted. This acknowledgement message causes the receiving host to send operations of the microtransaction for execution by the PIM component associated with the memory controller. In some implementations, the host transmits the transaction operations to the PIM component by way of the memory controller (e.g., the memory controller routes the microtransaction operations from the host core to the PIM component). Alternatively or additionally, the host transmits the transaction operations directly to the PIM component (e.g., independent of routing one or more of the transaction operations to the PIM component via the memory controller).

In some implementations, each PIM component includes an operation queue, which is used to enqueue operations of granted microtransaction requests for sequential execution. In some implementations, the memory controller associated with a corresponding one of the PIM components is configured to monitor the operation queue of the PIM component and identify a number of available slots for enqueueing transaction operations. In such implementations, the memory controller is configured to abstain from granting microtransaction requests until the PIM component operation queue has space (e.g., includes sufficient available slots) to enqueue operations of a requested transaction. The PIM component is configured to execute enqueued microtransaction operations and generate one or more results as part of performing a microtransaction (e.g., by processing data stored in memory at one or more memory addresses defined by the transaction header for the transaction).

In contrast to conventional computing architectures, the techniques described herein enable conflict-free scheduling of PIM transactions without implementing locks on data maintained at one or more addresses memory, thereby avoiding computational costs incurred by setting and releasing memory locks (e.g., computation, interconnect/memory bandwidth required to set and check memory locks). As a further advantage relative to conventional systems, the techniques described herein enable scheduling PIM transactions to PIM components that are managed by different memory controllers without requiring that a requesting host abort a transaction request when the transaction cannot be serviced when the transaction request is received at respective ones of the multiple memory controllers.

By utilizing multiple PIM components to perform a transaction, the described techniques do not create additional traffic on an interface between a memory module implementing the PIM components and the memory controllers or a host processor requesting performance of the transaction. By executing transactions using PIM, the described techniques further advantageously save cycles of the host processor, which reduces system power consumption and frees the host processor to perform additional operations relative to conventional systems.

In some aspects, the techniques described herein relate to a system including multiple memory segments, multiple processing-in-memory components that are each associated with a corresponding one of the multiple memory segments, and multiple memory controllers that are each responsible for scheduling operations of a transaction to be executed by a corresponding one of the multiple processing-in-memory components and each configured to receive a microtransaction request from a source that includes a transaction identifier for the transaction, and send an acknowledgement message for the microtransaction request to the source, or send a negative acknowledgment message for the microtransaction request to the source.

In some aspects, the techniques described herein relate to a system, wherein the microtransaction request received by each of the multiple memory controllers includes one or more operations of the transaction to be executed by a corresponding one of the multiple memory controllers using data stored in a corresponding one of the multiple memory segments.

In some aspects, the techniques described herein relate to a system, wherein the transaction requires executing the one or more operations included in the microtransaction request by a corresponding one of the multiple processing-in-memory components sequentially and without interruption.

In some aspects, the techniques described herein relate to a system, further including an addressing system configured to generate a plurality of microtransaction requests for the transaction.

In some aspects, the techniques described herein relate to a system, wherein the addressing system is configured to generate the plurality of microtransaction requests by translating virtual address information included in a transaction header for the transaction to physical address information describing addresses in the multiple memory segments at which data involved in executing the transaction is stored.

In some aspects, the techniques described herein relate to a system, wherein the addressing system is configured to assign the transaction identifier for the transaction to each of the plurality of microtransaction requests.

In some aspects, the techniques described herein relate to a system, wherein the transaction identifier is assigned based on a counter value maintained at a counter of at least one of the multiple memory controllers.

In some aspects, the techniques described herein relate to a system, wherein the at least one of the multiple memory controllers is configured to transmit the counter value to the addressing system in response to receiving a transaction header for the transaction.

In some aspects, the techniques described herein relate to a system, wherein the acknowledgement message causes the source to send one or more operations of the microtransaction request to a corresponding one of the multiple memory controllers for routing to a corresponding one of the multiple processing-in-memory components.

In some aspects, the techniques described herein relate to a system, wherein the acknowledgement message causes the source to send one or more operations of the microtransaction request directly to a corresponding one of the multiple processing-in-memory components.

In some aspects, the techniques described herein relate to a system, wherein the acknowledgment message is sent responsive to a current counter value of a counter maintained at a corresponding one of the multiple memory controllers being equal to the transaction identifier for the transaction.

In some aspects, the techniques described herein relate to a system, wherein the acknowledgement message is sent in response to identifying that an operation queue of a corresponding one of the multiple processing-in-memory components has space to queue operations of the microtransaction request.

In some aspects, the techniques described herein relate to a system, wherein the negative acknowledgement message is sent in response to a current counter value of a counter maintained at a corresponding one of the multiple memory controllers being different from the transaction identifier for the transaction.

In some aspects, the techniques described herein relate to a system, wherein the negative acknowledgement message is sent to the source with a retry interval that indicates an amount of time to wait before subsequently sending the microtransaction request.

In some aspects, the techniques described herein relate to a system, wherein the retry interval is computed based on a load described by one or more transaction identifiers buffered in buffer of a corresponding one of the multiple memory controllers.

In some aspects, the techniques described herein relate to a system, wherein each of the multiple memory controllers is implemented in a host and the source includes a core of the host.

In some aspects, the techniques described herein relate to a system, wherein the negative acknowledgement message causes the source to refrain from sending operations of the microtransaction request for execution by a corresponding one of the multiple processing-in-memory components until receiving a subsequent acknowledgement message from a corresponding one of the multiple memory controllers.

In some aspects, the techniques described herein relate to a system, wherein the acknowledgement message causes the source to send operations of the microtransaction request for execution by a corresponding one of the multiple processing-in-memory components without locking one or more locations in memory of a corresponding one of the multiple memory segments.

In some aspects, the techniques described herein relate to a method including receiving, at a memory controller and from a host processing device, a request for a processing-in-memory component to execute at least one operation of a microtransaction that defines a subset of operations for a transaction identified by a transaction identifier, maintaining, by the memory controller, a current counter and updating a value of the current counter in response to the processing-in-memory component completing execution of a prior transaction, and causing, by the memory controller, the processing-in-memory component to execute the at least one operation of the microtransaction by sending an acknowledgment message to the host processing device responsive to identifying that the value of the current counter equals the transaction identifier.

In some aspects, the techniques described herein relate to a device including a processing-in-memory component configured to receive, from a memory controller associated with the processing-in-memory component, a request to execute at least one operation of a microtransaction that defines a subset of operations for a transaction identified by a transaction identifier, and execute the at least one operation of the microtransaction in response to a value of a current counter maintained at the memory controller being equal to the transaction identifier.

FIG. 1 is a block diagram of a system 100 that includes a host with at least one core and multiple memory segments, where each of the multiple memory segments include a memory and are associated with a processing-in-memory component and a memory controller.

In particular, the system 100 includes host 102 and multiple memory modules 104. For instance, in the illustrated example of FIG. 1, system 100 includes memory module 104(1), memory module 104(2) and memory module 104(*m*), where m represents any integer. The host 102 is connected to individual ones of the memory modules 104 via a communicative coupling, such as the connection/interface 106 connecting the host 102 with the memory module 104(2). In one or more implementations, the host 102 includes at least one core 108. In some implementations, the host 102 includes multiple cores 108. For instance, in the illustrated example of FIG. 1, host 102 is depicted as including core 108(1) and core 108(*n*), where n represents any integer. Each of the memory modules 104 includes memory 110 and a processing-in-memory component 112.

In accordance with the described techniques, the host 102 is connected to each of the multiple memory modules 104 via a wired or wireless connection, such as the connection/interface 106 connecting host 102 with memory module 104(2) in the illustrated example of FIG. 1. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that performs various operations on and/or using data in the memory 110 (e.g., at least two of the memories 110(1) to 110(*m*)). Examples of the host 102 and/or a core 108 of the host include, but are not limited to, a central processing unit (CPU), a graphics processing unit (GPU), a field programmable gate array (FPGA), an accelerated processing unit (APU), and a digital signal processor (DSP). For example, in one or more implementations a core 108 is a processing unit that reads and executes instructions (e.g., of a program), examples of which include to add data, to move data, and to branch data.

In one or more implementations, each memory module of the multiple memory modules 104 is a circuit board (e.g., a printed circuit board), on which a corresponding portion of the memory 110 is mounted and includes a corresponding one of the multiple processing-in-memory components 112. Although described and illustrated in the context of different memory segments being implemented as separate memory modules, the techniques described herein are applicable to different system architectures where different segments of memory are alternatively or additionally configured in different manner such as memory interleaving architectures, memory channel segmentation architectures, memory module segmentation architectures, memory region segmentation architectures, combinations thereof, and so forth.

In some variations, one or more integrated circuits of a memory are mounted on the circuit board of the memory module 104 (e.g., memory 110(1) of memory module 104 (1)), and each of the multiple memory modules 104 includes one or more processing-in-memory components 112. Examples of the multiple memory modules 104 include, but are not limited to, TransFlash memory modules, single in-line memory modules (SIMM), dual in-line memory modules (DIMM), and combinations thereof. In one or more implementations, each of the multiple memory modules 104 is a single integrated circuit device that incorporates a respective portion of the memory 110 and a respective one of the multiple processing-in-memory components 112 on a single chip. In some examples, one or more of the multiple memory modules 104 is composed of multiple chips that implement a respective portion of the memory 110 and a respective one of the multiple processing-in-memory components 112 that are vertically ("3D") stacked together, are placed side-by-side on an interposer or substrate, or are assembled via a combination of vertical stacking or side-by-side placement.

Each portion of the memory 110 (e.g., the memory 110(1), memory 110(2), and memory 110(*m*)) is a device or system that is used to store information, such as for immediate use in a device (e.g., by a core 108 of the host 102 and/or by a corresponding one of the multiple processing-in-memory components 112). In one or more implementations, each portion of the memory 110 corresponds to semiconductor memory where data is stored within memory cells on one or more integrated circuits. In at least one example, the memory 110 corresponds to or includes volatile memory, examples of which include random-access memory (RAM), dynamic random-access memory (DRAM), synchronous dynamic random-access memory (SDRAM), static random-access memory (SRAM), combinations thereof, and so forth.

For example, one or more portions of the memory 110 represents high bandwidth memory (HBM) in a 3D-stacked implementation. Alternatively or additionally, one or more portions of the memory 110 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). The memory 110 is thus configurable in a variety of ways that support memory verification (e.g., of the memory 110) using processing-in-memory without departing from the spirit or scope of the described techniques.

Broadly, each of the multiple processing-in-memory components 112 is configured to process processing-in-memory operations involved as part of one or more transactions (e.g., operations of a transaction received from the core 108 via the connection/interface 106). Each processing-in-memory component 112 is representative of a processor with example processing capabilities ranging from relatively simple (e.g., an adding machine) to relatively complex (e.g., a CPU/GPU compute core). In an example, each processing-in-memory component 112 processes the one or more transactions by executing associated operations using data stored in a corresponding portion of the memory 110 that is accessible by the processing-in-memory component. For instance, processing-in-memory component 112(1) executes operations using data stored in memory 110(1), processing-in-memory component 112(2) executes operations using data stored in memory 110(2), and processing-in-memory component 112(*m*) executes operations using data stored in memory 110(*m*).

Processing-in-memory contrasts with standard computer architectures which obtain data from memory, communicate the data to a processing unit (e.g., a core 108 of the host 102), and process the data using the processing unit (e.g., using a core 108 of the host 102 rather than one or more of the multiple processing-in-memory components 112). In various scenarios, the data produced by the processing unit as a result of processing the obtained data is written back to memory, which involves communicating the produced data over the connection/interface 106 from the processing unit to memory. In terms of data communication pathways, the processing unit (e.g., a core 108 of the host 102) is further away from the memory 110 than the processing-in-memory component 112, both physically and topologically. As a result, conventional computer architectures suffer from increased data transfer latency, reduced data communication bandwidth, and increased data communication energy, particularly when the volume of data transferred between the memory and the processing unit is large, which can also decrease overall computer performance.

Thus, each of the multiple processing-in-memory components 112 enables increased computer performance while reducing data transfer energy as compared to standard computer architectures that implement processing hardware outside, or further from, the memory. Further, the multiple processing-in-memory components 112 alleviates memory performance and energy bottlenecks by moving one or more memory-intensive computations closer to the memory 110. Although the processing-in-memory components 112 are each illustrated as being disposed within a corresponding one of the multiple memory modules 104, in some examples, the described benefits of memory verification using processing-in-memory are realizable through near-memory processing implementations in which one or more of the multiple processing-in-memory components 112 are disposed in closer proximity to the memory 110 (e.g., in terms of data communication pathways) than a core 108 of the host 102.

The system 100 is further depicted as including multiple memory controllers 114. In implementations, the system 100 includes one memory controller 114 for each memory segment (e.g., one memory controller 114 for each multiple memory modules 104). Individual ones of the multiple memory controllers 114 are configured to receive a request to perform at least one operation involved in executing a transaction that the host 102 requests to be executed by the multiple processing-in-memory components 112. Although depicted in the example system 100 as being implemented separately from the host 102, in some implementations one or more of the multiple memory controllers are implemented locally as part of the host 102. Each memory controller 114 is further representative of functionality to schedule PIM transactions for a plurality of hosts, despite being depicted in the illustrated example of FIG. 1 as serving only a single host 102. For instance, in an example implementation a memory controller 114 schedules PIM transactions for a plurality of different hosts, where each of the plurality of different hosts include one or more cores that request execution of at least one operation (e.g., by a processing-in-memory component 112) to complete a PIM transaction.

In order to schedule execution of transaction operations by different processing-in-memory components 112 via different memory controllers 114, the system 100 includes an addressing system 116. The addressing system 116 represents functionality of the system 100 to receive a request to perform a transaction from a source and generate different microtransactions, where each microtransaction includes a subset of operations involved in performing the transaction. Each microtransaction includes a subset of transaction operations that are executable by a given processing-in-memory component 112 (e.g., a microtransaction does not include operations that involve processing data stored in a memory segment that cannot be accessed by a given processing-in-memory component 112).

For instance, in the illustrated example of FIG. 1, the addressing system 116 is depicted as receiving transaction 118 from core 108(1) and receiving transaction 120 from core 108(*n*). In implementations, receiving a transaction at the addressing system 116 involves receiving a transaction header for a transaction (e.g., the addressing system 116 receives a transaction header for transaction 118 from core 108(1) and receives a transaction header for transaction 120 from core 108(*n*).

In implementations, a transaction header includes information describing a source identifier for a source that generated the transaction header (e.g., a source identifier for a core 108 from which the transaction header was received). The transaction header further includes a task identifier for a transaction requested by a source to be performed by the multiple processing-in-memory components 112. The transaction header further describes virtual address information for data to be processed as part of performing various operations of the transaction. The addressing system 116 is configured to translate a virtual address, for each instance of data (e.g., each data object) processed as part of performing the transaction into a physical address that describes a location in memory 110 that stores the data to be processed by the multiple processing-in-memory components 112 as part of performing the transaction.

In some implementations, a transaction header for a transaction includes information that describes a transaction start operation (e.g., a first operation executed for the transaction), a transaction end operation (e.g., a final operation executed for the transaction), and a total number of operations executed as part of performing the transaction. In accordance with the described techniques, the multiple operations of a transaction are required to be performed atomically by the processing-in-memory components 112, independent of interruption (e.g., without the processing-in-memory components 112 interleaving execution of the transaction operations with execution of one or more operations not involved with the transaction). After translating the virtual addresses for a transaction into physical addresses that define actual locations in the memory 110 distributed among different memory segments (e.g., multiple memory modules 104), the addressing system 116 generates one or more microtransactions for the transaction. Each microtransaction includes operations that involve processing data stored in a given one of the multiple memory segments, such that the microtransaction is executable by a processing-in-memory component 112 associated with the memory segment.

For instance, in the illustrated example of FIG. 1, the addressing system 116 is depicted as generating microtransaction 122, microtransaction 124, and microtransaction 126 for transaction 118. The addressing system 116 is further depicted as generating microtransaction 128, microtransaction 130, and microtransaction 132 for transaction 120. Each microtransaction represents a subset of operations (e.g., at least one operation and less than an entirety of operations) involved in executing a transaction, where the operations included in the microtransaction are executable by one of the processing-in-memory components 112. For instance, the depicted example of FIG. 1 represents a scenario where the addressing system 116 identifies that data involved in performing operations of microtransaction 122 and microtransaction 128 are stored in memory 110(1), such that the microtransaction 122 and microtransaction 128 are executable by the processing-in-memory component 112(1). Similarly, data involved in performing operations of microtransaction 124 and microtransaction 130 is sored in memory 110(2), such that the microtransaction 124 and microtransaction 130 are executable by the processing-in-memory component 112(2). Further, the addressing system 116 identifies that data involved in performing operations of the microtransaction 126 and the microtransaction 132 are stored in memory 110(*m*), such that the microtransaction 126 and the microtransaction 132 are executable by the processing-in-memory component 112(*m*).

To ensure that operations of a transaction are executed atomically among different processing-in-memory components 112, the addressing system 116 is configured to assign a transaction identifier to a transaction, as well as all microtransactions into which the transaction is segmented. For instance, the addressing system 116 assigns a first transaction identifier to the transaction 118, the microtransaction 122, the microtransaction 124, and the microtransaction 126 (e.g., as indicated by the white boxes depicted on transaction 118 and its respective microtransactions). The addressing system 116 assigns a second transaction identifier, which is different from the first transaction identifier, to the transaction 120, the microtransaction 128, the microtransaction 130, and the microtransaction 132 (e.g., as indicated by the black boxes depicted on transaction 120 and its respective microtransactions).

To coordinate transaction identifier assignment among transactions received from different sources by the addressing system 116, and scheduling of respective microtransactions generated for each transaction, each of the multiple memory controllers 114 includes a current counter 134 and a next counter 136. The current counter 134 represents a counter that is updated to reflect a value of a transaction identifier that should be scheduled for execution, or that is actively being executed, by a processing-in-memory component 112 associated with a given memory controller 114. The next counter 136 includes a value that defines a transaction identifier for a next transaction to be issued by the addressing system 116. In this manner, when generating microtransactions for a transaction, the addressing system 116 is configured to transmit a transaction header request to the memory controllers 114 with return packets that cause each memory controller 114 to increment a value of its respective next counter 136 and return that incremented value to the addressing system 116 for use in assigning the incremented value as a transaction identifier for a transaction.

The current counter 134 is incremented by each memory controller 114 in response to detecting that all operations of a microtransaction previously scheduled by the memory controller 114 have been executed by a corresponding one of the processing-in-memory components 112. In some implementations, the return packets that cause each memory controller 114 to increment its next counter 136 include information describing a thread identifier of a thread that initiates a transaction, which is generated by the addressing system 116 by combining a stream identifier and a requester identifier for a source that requests the transaction, along with a count that represents a number of threads that have previously requested transactions via the addressing system 116.

In some implementations, the next counters 136 are synchronized among the multiple memory controllers 114, such that the next counters 136 each include a value representing a global counter value. Alternatively, in other implementations the next counters 136 are asynchronous, such that different memory controllers 114 include next counters 136 specifying different values. By assigning a common transaction identifier to all microtransactions generated for a transaction, the addressing system 116 ensures that the atomicity property of a transaction is respected and not interrupted by execution of operations for a different transaction. In implementations, transaction identifiers further define an order in which a memory controller schedules execution of different transactions, such that microtransactions are scheduled in an order defined by respective transaction identifiers rather than an order in which microtransactions are received by a given memory controller 114.

Each of the multiple memory controllers 114 is further depicted as including a transaction buffer 138. Each time the next counter 136 is incremented at a memory controller 114, the memory controller 114 adds transaction header information for a corresponding transaction that is assigned the incremented next counter 136 value as its transaction identifier, and the transaction identifier, to the transaction buffer 138. Upon detecting that execution of a previously scheduled microtransaction is complete, a memory controller 114 increments a value of its current counter 134 and identifies a corresponding transaction header maintained in the transaction buffer 138. Advantageously, using the techniques described herein, transaction buffer 138 enables scheduling of processing-in-memory transactions in a manner that reduces an amount of times a source needs to request performance of a transaction (e.g., a core 108 of the host 102 need only send a single request to the addressing system 116 for routing a given processing-in-memory transaction to multiple memory controllers 114).

In response to detecting that a value of its current counter 134 identifies (e.g., is equal to) a transaction identifier maintained in the transaction buffer 138, each of the multiple memory controllers 114 is configured to grant permission for the microtransaction identified by the transaction identifier to proceed. For instance, in the illustrated example of FIG. 1, in response to identifying that a value of the current counter 134(1) specifies a transaction identifier for microtransaction 122, the memory controller 114(1) grants permission for the microtransaction 122 to proceed via microtransaction grant 140. Similarly, in response to identifying that the respective values of current counter 134(2) and current counter **134(*m*) specify a transaction identifier for the microtransaction 122, the memory controller 114(2) grants permission for the microtransaction 124 to proceed as microtransaction grant 142 and the memory controller 114(*m*) grants permission for the microtransaction 126 to proceed as microtransaction grant 144**.

Alternatively, in response to detecting that a value of the current counter 134 is different than a transaction identifier for a microtransaction, the memory controller 114 refrains from granting the requested microtransaction until detecting that granting the transaction request would not cause a conflict (e.g., until detecting that the current counter 134 indicates it is acceptable to grant the microtransaction). When granting permission for a requested microtransaction to proceed (e.g., when issuing the microtransaction grant 140, the microtransaction grant 142, and/or the microtransaction grant 144), the corresponding memory controller 114 generates an acknowledgement message and transmits the acknowledgement message to a requesting source identified by the source identifier in the transaction header. Upon receipt of the acknowledgment message, the requesting source (e.g., the core 108(1)) is caused to send operations of the granted transaction for execution by a corresponding one of the multiple processing-in-memory components 112.

In some implementations, upon receipt of the acknowledgment message, the requesting source (e.g., the host 102 or a core 108) transmits one or more operations of a granted microtransaction request to a corresponding one of the multiple processing-in-memory components 112 via a corresponding one of the multiple memory controllers 114 (e.g., using the interface 106). Alternatively or additionally, in some implementations the requesting source transmits one or more operations of the granted microtransaction request directly to a processing-in-memory component 112 (e.g., independent of routing the one or more operations to the processing-in-memory component 112 via a memory controller 114) using the interface 106. In accordance with one or more implementations, the memory controller 114 is configured to generate the acknowledgement message to include instructions communicating transaction instructions to the processing-in-memory component 112 (e.g., via the memory controller 114, directly to the processing-in-memory component 112, a combination thereof, and so forth). Upon receipt of the microtransaction operations represented in FIG. 1 by microtransaction grant 140, the microtransaction grant 142, or the microtransaction grant 144, the receiving one of the multiple processing-in-memory components 112 adds the transaction operations to a local operation queue (e.g., an operation queue maintained by a processing-in-memory component 112) for execution.

In response to sending an acknowledgment message for a granted microtransaction request, the memory controller 114 removes the transaction header for the granted transaction request from the transaction buffer 138. In some implementations, the memory controller 114 removes the transaction header from the transaction buffer 138 in response to sending the acknowledgement message for the transaction header to the requesting source (e.g., host 102). Alternatively or additionally, the memory controller 114 removes the transaction header from the transaction buffer 138 in response to receiving confirmation from the requesting source that the microtransaction operations were sent to the processing-in-memory component 112. Alternatively or additionally, the memory controller 114 removes the transaction header from the transaction buffer 138 in response to identifying that the microtransaction operations described by the transaction header are enqueued at an operation queue of a corresponding processing-in-memory component 112.

Alternatively, in response to detecting that a conflict exists for a requested transaction associated with a transaction header, or in response to detecting that a processing-in-memory component 112 operation queue does not have enough slots to accommodate one or more operations of the requested transaction, the memory controller 114 sends a negative acknowledgment message to a requesting source and maintains the transaction header for a microtransaction in the transaction buffer 138. The negative acknowledgement message instructs the requesting source to not send operations of the requested transaction to a processing-in-memory component 112 for execution.

Further, because the memory controller 114 continues to store the transaction header for a microtransaction in the transaction buffer 138 after sending a negative acknowledgement message to a requesting source, in some implementations the memory controller 114 generates the negative acknowledgement message to instruct the requesting source from again requesting that the memory controller 114 grant the microtransaction request. In this manner, memory controller 114 causes a requesting source to abstain from sending multiple requests for a microtransaction, even after receiving a negative acknowledgement message, which is not possible using conventional system architectures. Instead, a requesting source is instructed to wait for the memory controller 114 to send an acknowledgement message.

For instance, after sending a negative acknowledgement message for a microtransaction request, the memory controller 114 sends an acknowledgement message to a requesting source in response to detecting that a value of the current counter 134 is the same as a transaction identifier for the microtransaction request. Alternatively or additionally, after sending a negative acknowledgement message for a microtransaction request, the memory controller 114 sends an acknowledgement message to the requesting source in response to calculating that the processing-in-memory component 112 will be finished executing all conflicting operations queued in an operation queue of the processing-in-memory component 112 before executing operations of the requested microtransaction. Alternatively or additionally, after sending a negative acknowledgement message for a microtransaction request, the memory controller 114 sends an acknowledgement message to the requesting source in response to detecting that the operation queue of a processing-in-memory component 112 has enough slots to enqueue one or more transactions of the requested microtransaction.

Alternatively, in some implementations the memory controller 114 generates and transmits a negative acknowledgement message to a requesting source without adding the transaction identifier for a microtransaction to the transaction buffer 138 (e.g., in scenarios where the transaction buffer 138 is full). In implementations where the memory controller 114 sends a negative acknowledgement message without adding a transaction identifier or transaction header for a microtransaction to the transaction buffer 138, the memory controller 114 includes a retry interval in the negative acknowledgement message. The retry interval defines a period of time that the requesting source should wait before again requesting that the memory controller 114 grant previously sent microtransaction request (e.g., before sending another instance of the microtransaction 122 to the memory controller 114(1)).

The memory controller 114 is configured to compute a retry interval for a denied microtransaction based on a current processing load, a scheduled processing load, or a combination thereof, for the processing-in-memory component 112 associated with the memory controller 114. For instance, the memory controller 114 is configured to compute a duration for the retry interval based on an estimated time for the processing-in-memory component 112 to finish execution of one or more operations enqueued in an operation queue of the processing-in-memory component 112. Alternatively or additionally, the memory controller 114 is configured to compute the duration for the retry interval based on an estimated time to clear one or more transaction headers from the transaction buffer 138 (e.g., an estimated time for the memory controller 114 to grant buffered microtransaction requests.

In some implementations, the memory controller 114 estimates a time required by the processing-in-memory component 112 to execute a microtransaction operation based on historic data that describes a measured amount of time used to previously execute the operation, multiple operations of a microtransaction, an entirety of a microtransaction, or similar microtransaction operations. Alternatively or additionally, the memory controller 114 estimates a time required by the processing-in-memory component 112 to execute a microtransaction operation based on a type of one or more computations involved in executing the transaction operation.

As part of executing a microtransaction operation, the processing-in-memory component 112 generates a result that includes data generated from processing data stored in the memory 110 during one or more microtransaction operations. Instructions included in the microtransaction operation for outputting the result are configurable in a variety of manners. For instance, in some implementations executing a microtransaction operation causes the processing-in-memory component 112 to communicate a result to a requesting source for the transaction (e.g., the core 108(1)). Alternatively or additionally, in some implementations instructions included in the microtransaction operation cause the processing-in-memory component 112 to output a result to a storage location in memory 110 (e.g., to update data stored in memory 110, for subsequent access and/or retrieval by the host 102, and so forth). Alternatively or additionally, in some implementations instructions included in the microtransaction operation cause the processing-in-memory component 112 to store a result locally (e.g., in a register of the processing-in-memory component 112).

Because each processing-in-memory component 112 executes transaction operations on behalf of the host 102, the processing-in-memory components 112 perform the described techniques with minimal impact on the system 100 (e.g., without invalidating caches of the system 100 or causing traffic on the connection/interface 106). For instance, the processing-in-memory components 112 perform operations on data stored in memory 110 "in the background" with respect to the host 102 and the core 108, which frees up cycles of the host 102 and/or the core 108, reduces memory bus traffic (e.g., reduces traffic on the connection/interface 106), and reduces power consumption relative to performing operations at the host 102 and/or the core 108. Notably, because each processing-in-memory component 112 is closer to the memory 110 than the core 108 of the host 102 in terms of data communication pathways, processing data stored in memory 110 is generally completable in a shorter amount of time using the processing-in-memory components 112 than if the evaluation were performed using the cores 108 of the host 102.

Further, in contrast to conventional computing architectures, the transaction buffer 138 of each memory controller 114 enables the memory controller 114 to handle conflict-free scheduling of microtransactions executed by the processing-in-memory component 112 without using locks on data maintained at one or more locations in memory 110 (e.g., without using host 102—implemented memory locks). As a further advantage relative to conventional systems, the transaction buffers 138 enables the memory controllers 114 to schedule microtransaction operations for execution by the multiple processing-in-memory components 112 independent of (e.g., without) the host 102 repeatedly requesting that the processing-in-memory components 112 perform a same transaction, or a same microtransaction, in response to receiving a negative acknowledgement request from the memory controller 114. Further, in implementations where the host 102 repeatedly requests that the processing-in-memory components 112 perform the same transaction, the memory controller 114 leverages information maintained in the transaction buffers 138 to avoid scheduling duplicate transactions. For instance, the memory controllers 114 avoid adding duplicate transaction identifiers to a transaction buffer 138 (e.g., does not buffer a transaction identifier when the transaction identifier is already maintained in a transaction buffer 138).

Figure 2:
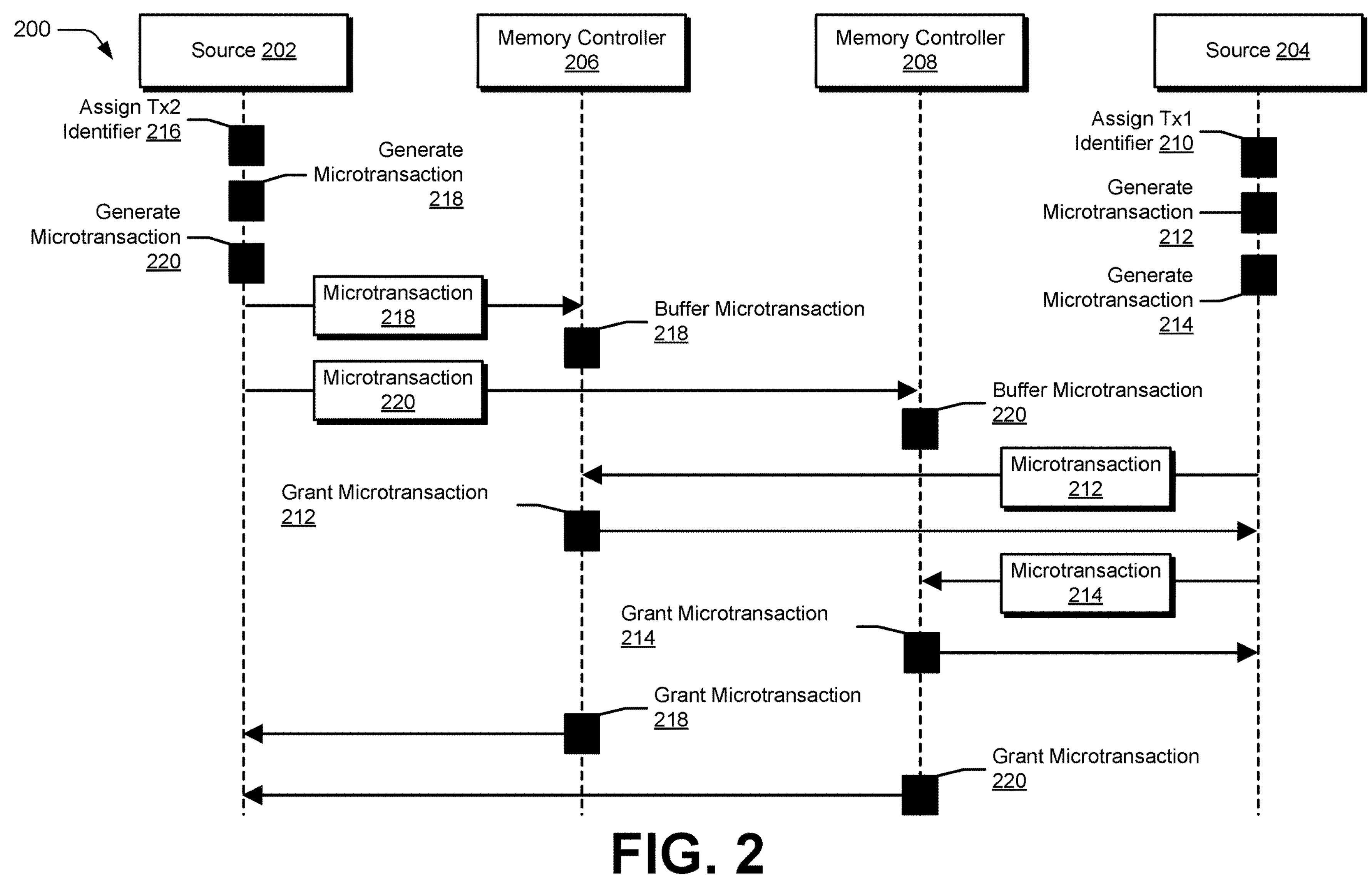
FIG. 2 depicts an example of scheduling microtransactions for a processing-in-memory transaction with different memory controllers.

FIG. 2 depicts an example 200 of scheduling microtransactions for a processing-in-memory transaction with different memory controllers.

The example 200 is depicted as including a first source 202 and a second source 204. Example sources of source 202 and source 204 include a single host 102, multiple different hosts (e.g., the host 102 and a different host), a single core 108 of the host 102, different cores of the host 102, or combinations thereof. The example 200 is further depicted as including multiple memory controllers—specifically memory controller 206 and memory controller 208, which are each representative of an example instance of a memory controller 114 as described with respect to FIG. 1.

Source 204 is depicted as assigning a first transaction identifier (Tx1) to a transaction requested by the source, as represented by operation block 210. In implementations, the first transaction identifier is assigned by an addressing system 116 implemented at the source 204, based on a value of a next counter 136 maintained at one or more of the memory controller 206 or the memory controller 208. In the illustrated example of FIG. 2, the next counter 136 maintained at the memory controller 206 and the next counter 136 maintained at the memory controller 208 include a same counter value, such that the first transaction identifier (Tx1) is assigned to the microtransactions allocated to the memory controller 206 and the memory controller 208, respectively. Alternatively, in implementations where the next counter 136 maintained at the memory controller 206 and the next counter 136 maintained at the memory controller 208 include different values, transaction identifiers assigned to microtransactions are assigned on a memory controller-specific basis, such that different microtransactions for a same transaction are assigned different transaction identifiers. In this manner, the transaction identifier assigned to a microtransaction is defined based on an order in which a memory controller will service the microtransaction (e.g., based on a number of microtransactions previously granted by a given memory controller).

The source 204 is further depicted as generating microtransaction 212 and generating microtransaction 214. In the context of the example 200, the microtransaction 212 includes operations of the transaction that are executable by a processing-in-memory component 112 associated with memory controller 206, as identified by the first transaction identifier. Similarly, the microtransaction 214 includes operations of the transaction that are executable by a processing-in-memory component 112 associated with memory controller 208, as identified by the first transaction identifier.

Source 202 is depicted as assigning a second transaction identifier (Tx2) to a transaction requested by the source, as represented by operation block 216. In implementations, the second transaction identifier is assigned by an addressing system 116 implemented at the source 202, based on a value of a next counters 136 maintained at one or more of the memory controller 206 or the memory controller 208. In the context of FIG. 2, the second transaction identifier represents a transaction that should be scheduled for execution only after executing the transaction identified by the first transaction identifier. The source 204 is further depicted as generating microtransaction 218 and generating microtransaction 220. In the context of example 200, the microtransaction 218 includes operations of the transaction identified by the second transaction identifier that are executable by a processing-in-memory component 112 associated with memory controller 206. Similarly, the microtransaction 220 includes operations of the transaction identified by the second transaction identifier that are executable by a processing-in-memory component 112 associated with memory controller 208.

Source 202 is depicted as sending microtransaction 218 to memory controller 206 and sending microtransaction 220 to memory controller 206. The memory controller 206 is caused to buffer microtransaction 218 and the memory controller 208 is caused to buffer microtransaction 220. In implementations, the memory controller 206 buffers microtransaction 218 and the memory controller 208 buffers microtransaction 220 in response to identifying that a value of a respective current counter 134 is different than the second transaction identifier (e.g., in response to identifying that the current counter 134 of memory controller 206 and the current counter 134 of memory controller 208 indicates a value corresponding to the first transaction identifier). In implementations, buffering the microtransaction 218 involves the memory controller 206 adding the second transaction identifier to a transaction buffer 138 and sending a negative acknowledgment message (NACK) to the source 202. In a similar manner, buffering the microtransaction 220 involves the memory controller 208 adding the second transaction identifier to a local transaction buffer 138 and sending a NACK to the source 202.

While the microtransaction 218 is buffered at memory controller 206 and the microtransaction 220 is buffered at memory controller 208, or prior to the buffering of the microtransaction 218 and the microtransaction 220, the source 204 sends microtransaction 212 to memory controller 206 and sends microtransaction 214 to memory controller 208. The memory controller 206 then executes microtransaction 212 and the memory controller 208 executes microtransaction 214. The memory controller 206 grants microtransaction 212 and memory controller 208 grants microtransaction 214, for instance, in response to identifying that a value of a respective current counter 134 maintained at each memory controller corresponds to (e.g., equals) the first transaction identifier.

As part of granting microtransaction 212, the memory controller 206 sends an acknowledgement message (ACK) to the source 204. Similarly, granting microtransaction 214 involves the memory controller 208 sending an ACK to the source 204. Upon receipt of an ACK for a microtransaction, the source 204 sends operations of microtransaction 212 to a processing-in-memory component 112 associated with the memory controller 206. In a similar manner, the source 204 sends operations of microtransaction 214 to a processing-in-memory component 112 associated with memory controller 208. As described above, in some implementations sending operations of a microtransaction are routed via a memory controller to a processing-in-memory component, are sent directly to a processing-in-memory component, or combinations thereof.

After granting microtransaction 212, or in response to determining that execution of the one or more operations included in microtransaction 212 is complete, the memory controller 206 increments a value of its current counter 134. Similarly, after granting microtransaction 214, or in response to identifying that execution of the one or more operations included in microtransaction 214 is complete, the memory controller 208 increments a value of its current counter 134. In response to its current counter 134 value equaling the second transaction identifier, the memory controller 206 grants microtransaction 218. Likewise, the memory controller 208 grants microtransaction 220 in response to a value of its current counter 134 being the second transaction identifier. Upon granting microtransaction 218, the memory controller 206 is configured to remove the second transaction identifier from its transaction buffer 138. The memory controller 208 similarly removes the second transaction identifier from its transaction buffer 138 upon granting microtransaction 220.

For instance, in an example implementation the memory controller 206 alters a "ready" bit value in a transaction header maintained in a transaction buffer 138 and associated with microtransaction 218 to indicate that microtransaction 218 has been granted and sent for processing by the processing-in-memory component 112 associated with memory controller 206. In this example implementations, memory controller 208 alters a "ready" bit value in a transaction header associated with microtransaction 220 to indicate that microtransaction 220 has been granted and sent for processing by the processing-in-memory component 112 associated with memory controller 208. Continuing this example implementation, other transaction headers in a transaction buffer 138 that have yet to be sent for processing by a processing-in-memory component 112 include respective "ready" bit values indicating that the respective requested transactions have yet to be granted by a memory controller.

As part of granting microtransaction 218, the memory controller 206 sends an ACK to the source 202. Similarly, granting microtransaction 220 involves the memory controller 208 sending an ACK to the source 202. Upon receipt of an ACK for a microtransaction, the source 202 sends operations of microtransaction 218 to a processing-in-memory component 112 associated with the memory controller 206. In a similar manner, source 202 sends operations of microtransaction 220 to a processing-in-memory component 112 associated with memory controller 208. As described above, in some implementations sending operations of a microtransaction are routed via a memory controller to a processing-in-memory component, are sent directly to a processing-in-memory component, or combinations thereof.

Each memory controller 114 (e.g., memory controller 206 and memory controller 208) is thus configured to efficiently schedule conflict-free processing of source-requested transactions for execution by multiple different processing-in-memory components 112 while ensuring atomic processing of the transaction's operations. Advantageously, the techniques described herein enable scheduling of PIM transactions via multiple memory controllers 114 without implementing locks in memory 110 or requiring that the requesting sources send more than one request for a given transaction, even in scenarios where a memory controller 114 sends a NACK and buffers a transaction request for subsequent processing, which is not enabled by conventional system architectures.

FIG. 3 depicts a procedure 300 in an example implementation of scheduling processing-in-memory transactions with different memory controllers.

A request for a processing-in-memory component to execute a microtransaction that includes at least one operation of a transaction is received at a memory controller (block 302). The memory controller 114(1), for instance, receives a transaction header for microtransaction 122 from core 108(1).

A counter value is incremented at the memory controller and the counter value is returned to a source of the request for assignment as a transaction identifier to the microtransaction (block 304). The memory controller 114(1), for instance, increments a value of the current counter 134(1) and returns the incremented value to the core 108(1) for assignment as a transaction identifier to the microtransaction 122 and other microtransactions of a transaction from which the microtransaction 122 was derived (e.g., for assignment to microtransaction 124 and microtransaction 126).

A transaction header for the microtransaction is added to a transaction buffer (block 306). The memory controller 114(1), for instance, adds a transaction header for microtransaction 122 to the transaction buffer 138(1). In some implementations, performance of the operation represented by block 306 is optional and the procedure 300 proceeds directly from block 304 to block 308.

An acknowledgement message is then sent that causes the source to transmit the at least one operation of the transaction included in the microtransaction (block 308). The memory controller 114(1), for instance, identifies that a value of the current counter 134(1) is equal to the transaction identifier for microtransaction 122 and sends an ACK to the core 108(1). The ACK causes the core 108(1) to send one or more operations included in the microtransaction 122 for execution by the processing-in-memory component 112(1).

The processing-in-memory component is then caused to output a result by executing the at least one operation of the microtransaction (block 310). The processing-in-memory component 112(1), for instance, atomically executes transaction operations included in the microtransaction 122 and outputs at least one result as part of executing the microtransaction 122. In one example, the processing-in-memory component 112(1) outputs a result to the core 108(1). Alternatively or additionally, the processing-in-memory component 112(1) stores the result for subsequent access (e.g., in memory 110(1) and/or locally in one or more registers of the processing-in-memory component 112(1) for subsequent access by the processing-in-memory component 112(1), the host 102, and so forth).

Performance of the operations depicted in the procedure 300 is configured to continue for servicing additional PIM microtransaction requests, as indicated by the dashed arrow returning to block 302 from block 310.

Figure 4:
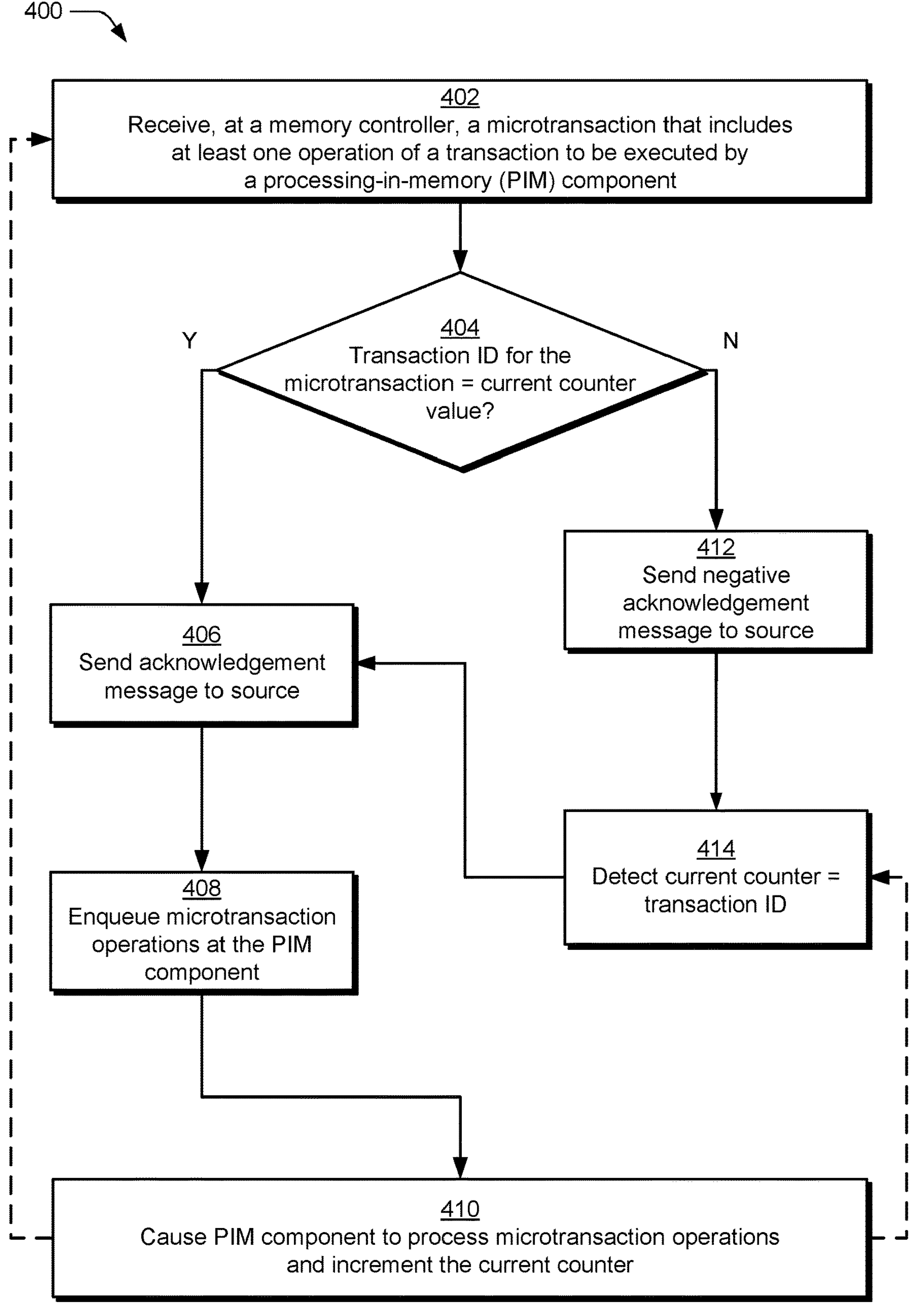
FIG. 4 depicts a procedure in an additional example implementation of scheduling processing-in-memory transactions with different memory controllers.

FIG. 4 depicts a procedure 400 in an additional example implementation of scheduling processing-in-memory transactions with different memory controllers.

A microtransaction that includes at least one operation of a transaction to be executed by a processing-in-memory component is received at a memory controller (block 402). The memory controller 114(2), for instance, receives microtransaction 130 from core 108(*n*). A determination is made as to whether the microtransaction can be enqueued at the processing-in-memory component (block 404). The memory controller 114(2), for instance, identifies a number of operations to be performed as part of executing microtransaction 130 and compares the number of operations to a number of open slots in an operation queue of the processing-in-memory component 112(2). In response to identifying that the microtransaction can be enqueued at the processing-in-memory component (e.g., a "Yes" determination at block 404), the memory controller sends an acknowledgement message to a source (block 406). The memory controller 114(2), for instance, sends an ACK to the core 108(*n*). After sending the ACK to the source, the at least one transaction operation included in the microtransaction is enqueued at the processing-in-memory component (block 408). The memory controller 114(2), for instance, receives the at least one operation included in the microtransaction 130 from core 108(*n*) and inputs the at least one operation included in the microtransaction 130 to an operation queue of the processing-in-memory component 112(2). Alternatively or additionally, the memory controller 114(2) instructs the core 108(*n*) to transmit the at least one operation included in microtransaction 130 directly to the processing-in-memory component 112(2).

The PIM component is then caused to process the microtransaction operations and a current counter value of the memory controller is incremented (block 410). The processing-in-memory component 112(2), for instance, is configured to process operations of the microtransaction 130 based on an order in which the transaction operations are enqueued (e.g., sequentially and without interruption by executing an operation out of order relative to a queue order). The memory controller 114(2) increments a value of current counter 134(2) in response to scheduling execution of the microtransaction 130 or in response to confirming completion of executing the microtransaction 130.

Alternatively, returning to block 404, in response to detecting that the microtransaction cannot be enqueued at the processing-in-memory component (e.g., a "No" determination a block 404), a negative acknowledgement message is sent to the source (block 412). The memory controller 114(2), for instance, sends a NACK to core 108(*n*) in response to identifying that a number of operations to be performed as part of executing microtransaction 130 exceeds a number of open slots in an operation queue of the processing-in-memory component 112(2).

In implementations, the negative acknowledgement message is generated in a manner that instructs the source to refrain from subsequently requesting that the processing-in-memory component 112(2) perform the requested microtransaction 130. For instance, the memory controller 114(2) generates the NACK to instruct the core 108(*n*) to not send another request for microtransaction 130.

In addition to sending the negative acknowledgment message to the source, the transaction header is buffered (block 414). The memory controller 114(2), for instance, adds a transaction header for the microtransaction 130 to the transaction buffer 138(2). In such an example, the transaction identifier for microtransaction 130 is maintained at transaction buffer 138(2) to ensure that the microtransaction 130 is not aborted by the core 108(*n*) despite not receiving an ACK for the microtransaction 130.

In some implementations, performance of block 414 (e.g., buffering the transaction header) is optional. For instance, in some implementations sending the NACK for microtransaction 130 is performed without buffering the transaction identifier for the microtransaction 130. In one example implementation the memory controller 114(2) computes a retry interval for the microtransaction 130 and includes the retry interval in the NACK. In such an example implementation, the retry interval instructs the core 108(*n*) to resubmit the microtransaction 130 to the memory controller 114(2) after a duration described by the retry interval.

In implementations where the memory controller 114(2) buffers a transaction header for the microtransaction 130, the memory controller 114(2) monitors the processing-in-memory component 112(2) to determine whether one or more queue slots open (block 416). The memory controller 114(2), for instance, monitors an operation queue of the processing-in-memory component 112(2) and detects when one or more slots in the operation queue are available to enqueue operations associated with the microtransaction 130. In response to detecting that the processing-in-memory component 112(2) is unable to execute one or more operations of the microtransaction 130 (e.g., responsive to a "No" determination due to a memory location conflict or due to overflowing the operation queue of the PIM component 112(2)), the transaction header is maintained in the transaction header buffer 138(2), as indicated by the arrow returning to block 414 from block 416.

Alternatively, in response to detecting that the processing-in-memory component 112(2) is able to enqueue one or more operations of microtransaction 130 for execution (e.g., responsive to a "Yes" determination due to no memory location conflicts or due to sufficient space available in the operation queue of the PIM component 112(2)), the procedure 400 proceeds from block 416 to block 406.

After sending the NACK, a value of the current counter is detected as being equal to the transaction identifier for the microtransaction (block 414). The memory controller 114 (2), for instance, monitors updates to the current counter 134(2) and detects when the current counter 134(2) value equals the transaction identifier for the microtransaction 130. Upon detecting that the current counter value equals the transaction identifier for the microtransaction 130, operation proceeds from block 414 to block 406.

Figure 5:
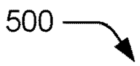
FIG. 5 depicts a procedure in an additional example implementation of scheduling processing-in-memory transactions with different memory controllers.

FIG. 5 depicts a procedure 500 in an additional example implementation of scheduling processing-in-memory transactions with different memory controllers.

To being, a transaction that includes operations to be executed by at least two different processing-in-memory components is received from a source (block 502). The addressing system 116, for instance, receives transaction 118 from core 108(1), which includes operations that involve processing data by processing-in-memory component 112 (1), processing-in-memory component 112(2), and processing-in-memory component 112(*m*).

The transaction is separated into at least two microtransactions that each include operations of the transaction to be executed by one of the different processing-in-memory components (block 504). The addressing system 116, for instance, segments operations of the transaction 118 to be performed by processing-in-memory component 112(1) into microtransaction 122, segments operations of the transaction 118 to be performed by the processing-in-memory component 112(2) into microtransaction 124, and segments operations of the transaction 118 to be performed by the processing-in-memory component 112(*m*) into microtransaction 126.

A transaction identifier is assigned to the transaction based on a counter value maintained at a memory controller associated with one of the different processing-in-memory components (block 506). The addressing system 116, for instance, receives an indication of a value maintained at one or more of the next counters 136(1), 136(2), or 136(*m*) and assigns the value as a transaction identifier to the transaction 118, the microtransaction 122, the microtransaction 124, and the microtransaction 126.

Each of the at least two microtransactions are then sent to a corresponding one of the different processing-in-memory components (block 508). The core 108(1), for instance, sends operations of the microtransaction 122 for execution by the processing-in-memory component 112(1), sends operations of the microtransaction 124 for execution by the processing-in-memory component 112(2), and sends operations of the microtransaction 126 for execution by the processing-in-memory component 112(*m*).

The example techniques described herein are merely illustrative and many variations are possible based on this disclosure. Although features and elements are described above in particular combinations, each feature or element is usable alone without the other features and elements or in various combinations with or without other features and elements.

The various functional units illustrated in the figures and/or described herein (including, where appropriate, the host 102 having the core 108 and the addressing system 116, the memory modules 104 having the memory 110 and the processing-in-memory components 112, and the memory controllers 114) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:

multiple memory segments;

multiple processing-in-memory components that are each associated with a corresponding one of the multiple memory segments; and multiple memory controllers that are each responsible for scheduling operations of a transaction to be executed by a corresponding one of the multiple processing-in-memory components, each of the multiple memory controllers configured to:

receive a microtransaction request from a source that includes a transaction identifier for the transaction; and send an acknowledgement message for the microtransaction request to the source responsive to a counter value, of a counter maintained at the memory controller, specifying the transaction identifier; or send a negative acknowledgment message for the microtransaction request to the source.

2. The system of claim 1, wherein the microtransaction request received by each of the multiple memory controllers comprises one or more operations of the transaction to be executed by a corresponding one of the multiple memory controllers using data stored in a corresponding one of the multiple memory segments.

3. The system of claim 2, wherein the transaction requires executing the one or more operations included in the microtransaction request by a corresponding one of the multiple processing-in-memory components sequentially and without interruption.

4. The system of claim 1, further comprising an addressing system configured to generate a plurality of microtransaction requests for the transaction.

5. The system of claim 4, wherein the addressing system is configured to generate the plurality of microtransaction requests by translating virtual address information included in a transaction header for the transaction to physical address information describing addresses in the multiple memory segments at which data involved in executing the transaction is stored.

6. The system of claim 4, wherein the addressing system is configured to assign the transaction identifier for the transaction to each of the plurality of microtransaction requests.

7. The system of claim 6, wherein the transaction identifier is assigned based on an additional counter value maintained at an additional counter of at least one of the multiple memory controllers.

8. The system of claim 7, wherein the at least one of the multiple memory controllers is configured to transmit the additional counter value to the addressing system in response to receiving a transaction header for the transaction.

9. The system of claim 1, wherein the acknowledgement message causes the source to send one or more operations of the microtransaction request to a corresponding one of the multiple memory controllers for routing to a corresponding one of the multiple processing-in-memory components.

10. The system of claim 1, wherein the acknowledgement message causes the source to send one or more operations of the microtransaction request directly to a corresponding one of the multiple processing-in-memory components.

11. The system of claim 1, wherein the acknowledgement message is sent in response to identifying that an operation queue of a corresponding one of the multiple processing-in-memory components has space to queue operations of the microtransaction request.

12. The system of claim 1, wherein the negative acknowledgement message is sent in response to the counter value being different from the transaction identifier for the transaction.

13. The system of claim 1, wherein the negative acknowledgement message is sent to the source with a retry interval that indicates an amount of time to wait before subsequently sending the microtransaction request.

14. The system of claim 13, wherein the retry interval is computed based on a load described by one or more transaction identifiers buffered in buffer of a corresponding one of the multiple memory controllers.

15. The system of claim 1, wherein each of the multiple memory controllers is implemented in a host and the source comprises a core of the host.

16. The system of claim 1, wherein the negative acknowledgement message causes the source to refrain from sending operations of the microtransaction request for execution by a corresponding one of the multiple processing-in-memory components until receiving a subsequent acknowledgement message from a corresponding one of the multiple memory controllers.

17. The system of claim 1, wherein the acknowledgement message causes the source to send operations of the microtransaction request for execution by a corresponding one of the multiple processing-in-memory components without locking one or more locations in memory of a corresponding one of the multiple memory segments.

18. A method comprising:

receiving, at a memory controller and from a host processing device, a request for a processing-in-memory component to execute at least one operation of a microtransaction that defines a subset of operations for a transaction identified by a transaction identifier;

maintaining, by the memory controller, a current counter and updating a value of the current counter in response to the processing-in-memory component completing execution of a prior transaction; and causing, by the memory controller, the processing-in-memory component to execute the at least one operation of the microtransaction by sending an acknowledgment message to the host processing device responsive to identifying that the value of the current counter maintained at the memory controller equals the transaction identifier.

19. A device comprising:

a processing-in-memory component configured to:

receive, from a memory controller associated with the processing-in-memory component, a request to execute at least one operation of a microtransaction that defines a subset of operations for a transaction identified by a transaction identifier; and execute the at least one operation of the microtransaction in response to a counter value, of a current counter maintained at the memory controller, being equal to the transaction identifier.

20. The method of claim 18, wherein the acknowledgement message is sent by the memory controller in response to identifying that an operation queue of the processing-in-memory component has space to queue operations of the request.

* * * * *